United States Patent
Hsu et al.

(10) Patent No.: US 7,568,261 B2
(45) Date of Patent: Aug. 4, 2009

(54) HINGE ASSEMBLY FOR FOLDABLE ELECTRONIC DEVICE

(75) Inventors: Sheng-Cheng Hsu, Taipei Hsien (TW); Wen-Lin Gan, Shenzhen (CN); Lian-Cheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 247 days.

(21) Appl. No.: 11/565,516

(22) Filed: Nov. 30, 2006

(65) Prior Publication Data

US 2008/0078061 A1    Apr. 3, 2008

(30) Foreign Application Priority Data

Jul. 14, 2006   (CN) .................. 2006 1 0061652

(51) Int. Cl.
*E05D 3/10* (2006.01)
(52) U.S. Cl. .................. 16/367; 16/282; 16/287; 16/294; 16/302; 16/366; 361/681
(58) Field of Classification Search .................. 16/282, 16/287, 288, 294, 302, 366–370; 379/433.13, 379/433.11; 361/681
See application file for complete search history.

(56) References Cited

U.S. PATENT DOCUMENTS

| | | | | |
|---|---|---|---|---|
| 6,883,206 B2* | 4/2005 | Yang et al. | .................... | 16/337 |
| 7,017,235 B2* | 3/2006 | Lu et al. | ........................ | 16/367 |
| 7,055,218 B2* | 6/2006 | Lu et al. | ........................ | 16/367 |
| 7,096,540 B2* | 8/2006 | Watanabe et al. | ............. | 16/367 |
| 7,158,816 B1* | 1/2007 | Mizuta et al. | ............ | 455/575.3 |
| 2005/0251964 A1 | 11/2005 | Lu et al. | | |
| 2006/0029218 A1* | 2/2006 | Lu et al. | ................ | 379/433.13 |
| 2007/0174997 A1* | 8/2007 | Lu et al. | ........................ | 16/367 |

FOREIGN PATENT DOCUMENTS

| | | | |
|---|---|---|---|
| CN | 2527666 Y | 12/2002 | |
| CN | 1592561 A | 3/2005 | |

* cited by examiner

*Primary Examiner*—Victor Batson
*Assistant Examiner*—Emily M Morgan
(74) *Attorney, Agent, or Firm*—Steven M. Reiss

(57) ABSTRACT

An exemplary hinge assembly (10) includes a base body (12), a bracket (14), a support board (18), a pivotal mechanism (16) and a rotational mechanism. The pivotal mechanism includes a pivotal shaft (163) fixed to the base body and rotatable relative to the bracket, an elastic member (165) and a fixing member (167). The rotational mechanism includes a rotational shaft (191), a rotary member (193), a steady member (195) and an elastic member (197). The support board and the rotary member are rotatable relative to the steady member, the base body, the bracket and the pivotal mechanism around a second axis. Each of the rotary member and the steady member defines an engaging surface (1932, 1951). One of the engaging surfaces forms at least one peak (1933), and the other of the engaging surfaces defines at least one valley (1953) corresponding to the peak.

20 Claims, 6 Drawing Sheets

HINGE ASSEMBLY FOR FOLDABLE ELECTRONIC DEVICE

BACKGROUND OF THE INVENTION

1. Field of the Invention

The present invention relates generally to hinge assemblies and, more particularly to a biaxial hinge assembly typically used for foldable electronic devices.

2. Discussion of the Related Art

An electronic device such as a mobile phone, a notebook computer or a PDA (personal digital assistant) generally has a body and a monitor (or panel) pivotally mounted on the body by a hinge. With a typical hinge, the monitor can only be turned about a horizontal axis in order to change a viewing angle, and cannot be turned left or right. In particular, a notebook computer monitor that includes a liquid crystal display (LCD) may inherently have a narrow range of viewing angles. A person who wants to view the monitor needs to position the notebook computer so that he/she is directly in front of the monitor, otherwise he/she may not be able to clearly see images displayed by the monitor. Thus, if a user wants to show the images displayed on the monitor to another person next to himself/herself, he/she needs to move the whole notebook computer left or right. That is, a notebook computer with a typical hinge can be quite inconvenient to use.

Therefore, a hinge assembly to solve the aforementioned problems is desired.

SUMMARY

A hinge assembly includes a base body, a bracket, a support board, a pivotal mechanism and a rotational mechanism. The base body includes a housing defining a cavity. The pivotal mechanism includes a pivotal shaft, an elastic member, and a fixing member. The pivotal shaft is fixed to the base body. The elastic member is configured for providing axial force along an axis of the pivotal shaft. The pivotal shaft runs through the bracket, the fixing member. The fixing member is fixedly engaged with the pivotal shaft such that the elastic member and part of the bracket is held between the fixing member and the pivotal shaft. The base body is rotatable relative to the bracket around a first axis coinciding with the axis of the pivotal shaft. The rotational mechanism includes a rotational shaft, a rotary member, a steady member and an elastic member. The steady member is at least partially received in the cavity of the base body and held therein. The elastic member is received in the cavity of the base body. The rotational shaft is extended through the support board, the rotary member, the steady member, the elastic member and the base body, the support board and the rotary member is rotatable in unison relative to the combination of the steady member and the base body around a second axis. Each of the rotary member and the steady member defines an engaging surface. The engaging surfaces are movably engaged with each other. One of the engaging surfaces forms at least one peak, and the other of the engaging surfaces defines at least one valley corresponding to the at least one peak.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly and associated electronic device. Moreover, in the drawings, like reference numerals designate corresponding parts throughout the several views.

DETAILED DESCRIPTION OF THE EMBODIMENTS

The present hinge assembly can be used in foldable electronic devices such as notebook computers, PDAs, or mobile phones. Hereinafter, for the purposes of conveniently describing an exemplary application of the hinge assembly, an embodiment of the hinge assembly as used in a notebook computer is described and illustrated.

Figure 1:
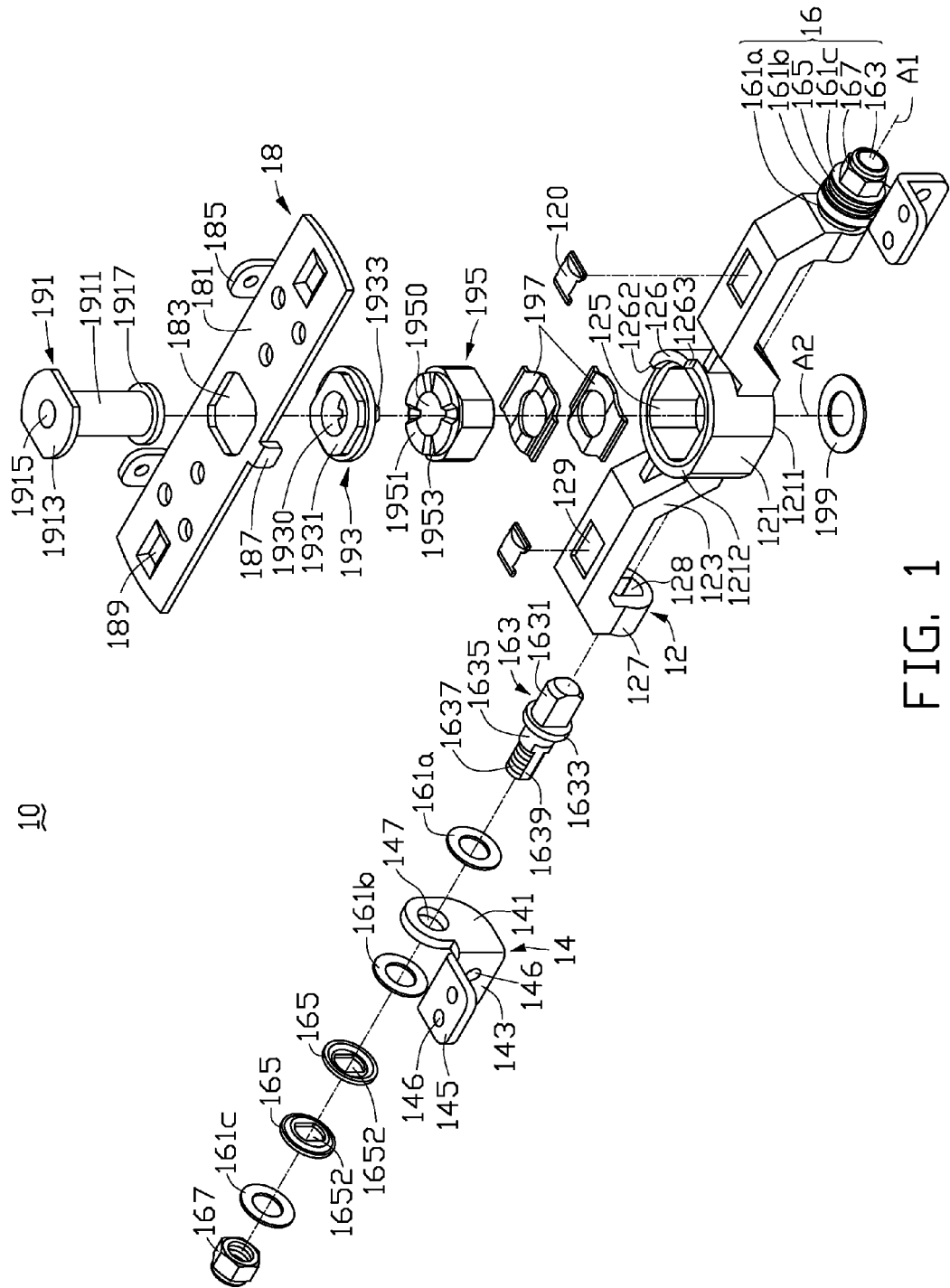
FIG. 1 is an exploded, isometric view of a hinge assembly in accordance with a preferred embodiment of the present application.
Figure 2:
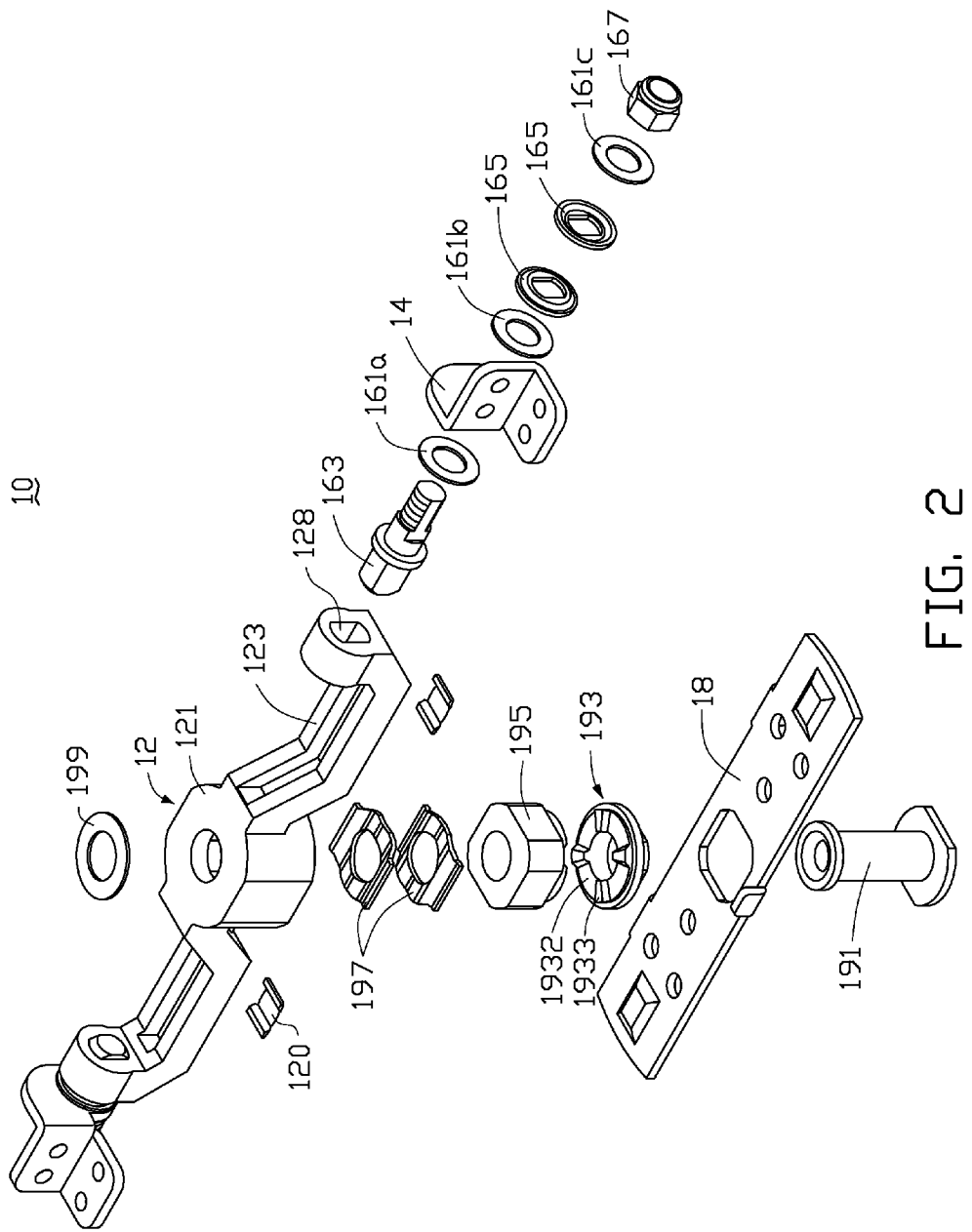
FIG. 2 is similar to FIG. 1, but showing the hinge assembly inverted.

Referring to the drawings in detail, FIG. 1 and FIG. 2 show a hinge assembly 10 of one exemplary embodiment of the present invention. The hinge assembly 10 includes a base body 12, two brackets 14, two pivotal mechanisms 16, a support board 18, and a rotational mechanism (not labeled). The hinge assembly 10 provides rotation around an axis A1 by virtue of the pivotal mechanisms 16, and rotation around an axis A2 perpendicular to the axis A1 by virtue of the rotational mechanism.

The base body 12 includes a housing 121 and two arms 123. The housing 121 is substantially a barrel. The two arms 123 extend from two opposite sides of an outer sidewall of the housing 121. The arms 123 are generally perpendicular to an axis of the housing 121. The housing 121 defines a generally polygonal cavity 125. In a preferred embodiment, the cavity 125 is approximately a square hole with rounded corners. The housing 121 includes a bottom first end 1211, and defines an end hole (not labeled) in the first end 1211. The end hole is smaller than, and communicates with, the cavity 125. The housing 121 forms a limiting protrusion 126 at a top second end 1212 thereof. The protrusion 126 includes two opposite limiting surfaces 1262, 1263. A bent portion 127 extends perpendicularly down from a distal end of each of the arms 123. The bent portion 127 defines a first keyed hole 128. In the preferred embodiment, the first keyed hole 128 has the shape of a symmetrically flattened circle. Each of the arms 123 defines a rectangular slot 129 in a top thereof. The slot 129 is configured to receive a rectangular resisting piece 120. A length of the slot 129 is slightly smaller than a corresponding width of the resisting piece 120. When the resisting pieces 120 are received in the slots 129, the resisting pieces 120 are slightly compressed. Thereby, the resisting pieces 120 become generally arc-shaped, and are firmly clipped in the slots 129.

Each bracket 14 includes a pivotal portion 141, and two mounting portions 143, 145. The pivotal portion 141 and the mounting portions 143, 145 are all perpendicular to one another. The pivotal portion 141 extends from one side of the mounting portion 143, and the mounting portion 145 extends from an adjacent side of the mounting portion 143. Each of the mounting portions 143, 145 defines at least one mounting hole 146. In the preferred embodiment, each of the mounting portions 143, 145 defines two mounting holes 146. The pivotal portion 141 defines a round pivotal hole 147.

Each of the pivotal mechanisms 16 includes three flat washers 161a, 161b, 161c, a pivotal shaft 163, a pair of spring washers 165, and a fixing member 167.

Each of the flat washers 161a, 161b, 161c defines a round hole (not labeled) in a center thereof.

The pivotal shaft 163 includes a flattened shaft portion 1631, a flange 1633, a pivotal shaft portion 1635, and a fixing portion 1637 arranged in that order. The flattened shaft portion 1631 has a cross-section the same as a cross-section of each of the first keyed holes 128 of the base body 12. The flange 1633 is a plate having a diameter larger than that of all the other portions of the pivotal shaft 163. The pivotal shaft portion 1635 is cylindrical-shaped. The fixing portion 1637 is threaded. The pivotal shaft 163 defines two symmetrically opposite flat surfaces 1639, which are commonly defined in the fixing portion 1637 and a part of the pivotal shaft portion 1635.

The spring washers 165 are generally disk-shaped, and are disposed adjacent each other but facing opposite directions. Each of the spring washers 165 defines a second keyed hole 1652. The fixing member 167 is typically a nut defining a screw hole (not labeled), for engaging with the fixing portion 1637 of the pivotal shaft 163.

Figure 3:
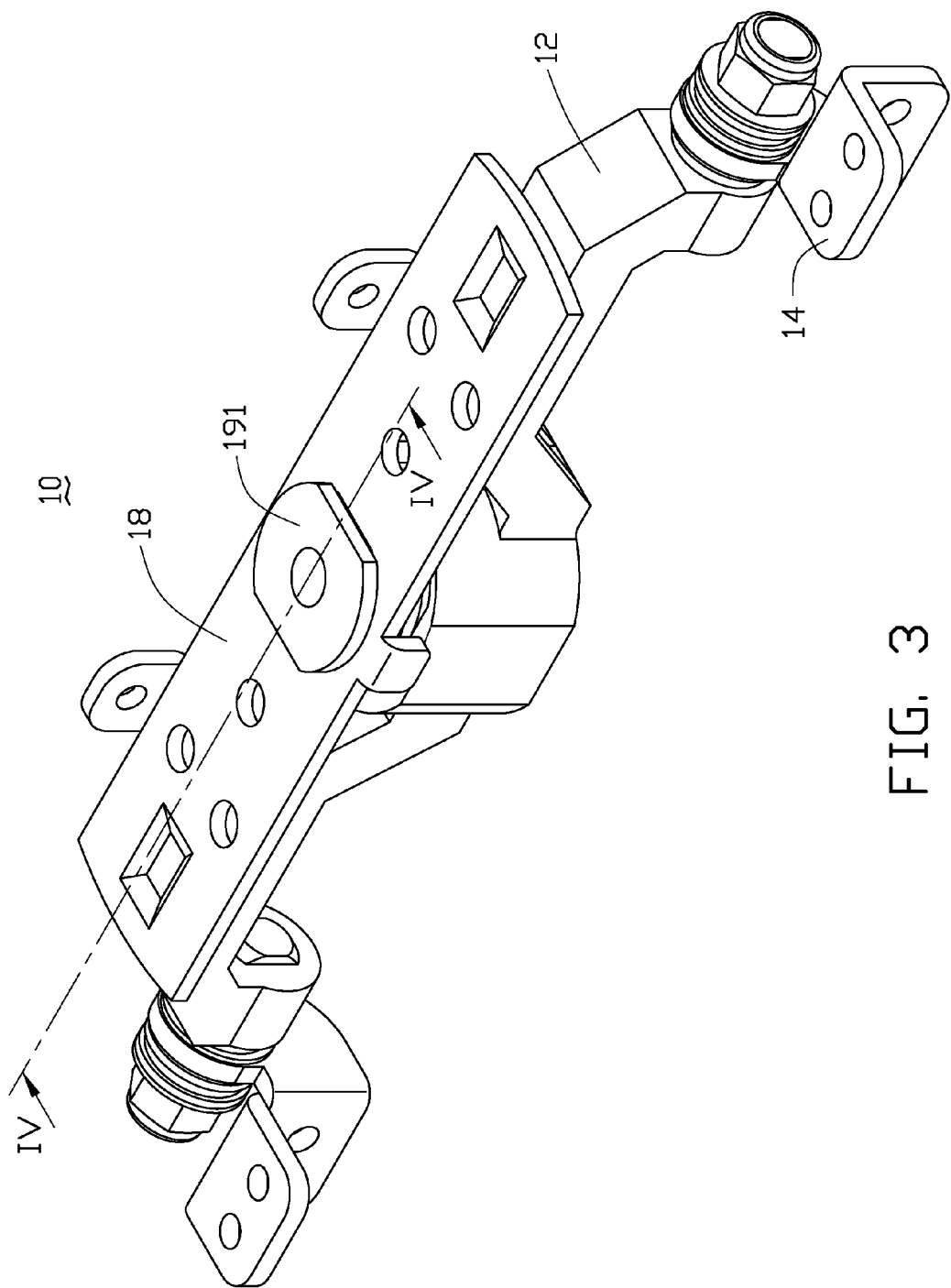
FIG. 3 is an assembled view of the hinge assembly of FIG. 1.
Figure 4:
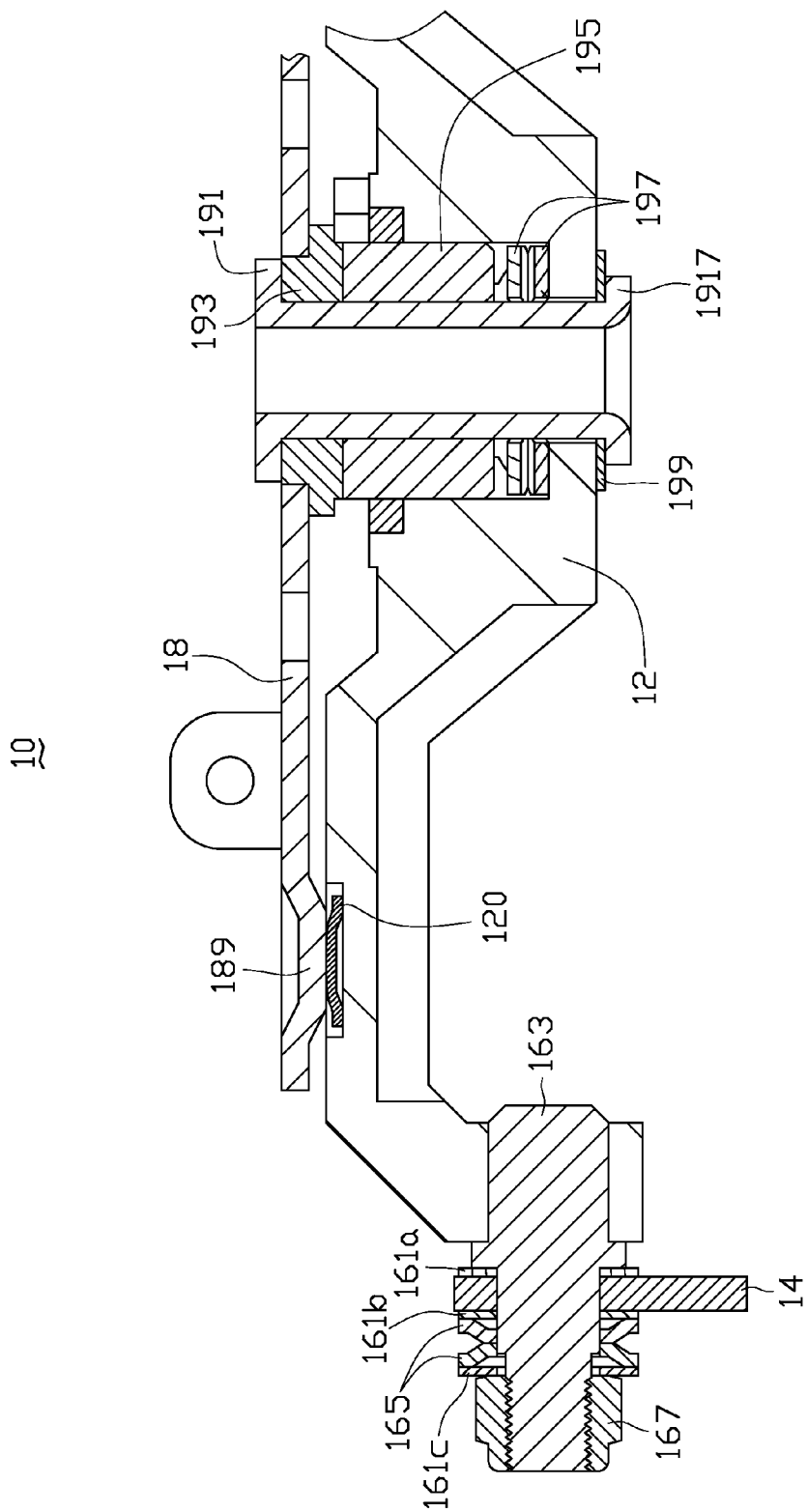
FIG. 4 is a cross-sectional view of part of the hinge assembly of FIG. 3, taken along line IV-IV thereof.

Referring also to FIG. 3 and FIG. 4, in assembly of each pivotal mechanism 16 to the base body 12, the flattened shaft portion 1631 of the pivotal shaft 163 is fittingly inserted into the first keyed hole 128 of a corresponding one of the arms 123 of the base body 12, thereby fixing the pivotal shaft 163 to the base body 12. The pivotal shaft 163 is extended through the round hole of the flat washer 161a, the pivotal hole 147 of the bracket 14, the round hole of the flat washer 161b, the second keyed holes 1652 of the pair of spring washers 165, and the round hole of the flat washer 161c. The fixing member 167 is engaged with the fixing portion 1637 of the pivotal shaft 163, and is thus disposed adjacent to the flat washer 161c. The flat washers 161a, 161b, 161c, the bracket 14, and the spring washers 165 are thus disposed between the fixing member 167 and the flange 1633 of the pivotal shaft 163. The fixing member 167 and the flange 1633 of the pivotal shaft 163 cooperatively prevent the flat washers 161a, 161b, 161c, the spring washers 165, and the bracket 14 from disengaging from the pivotal shaft 163. The pivotal shaft portion 1635 is movably engaged in the pivotal hole 147 of the bracket 14, and the flat surfaces 1639 of the pivotal shaft portion 1635 of the pivotal shaft 163 are engaged in the second keyed holes 1652 of the spring washers 165. Thereby, the pivotal mechanism 16 is assembled. The other pivotal mechanism 16 is assembled in the same manner. Thus the base body 12 is rotatable relative to the brackets 14. The base body 12, the pivotal shafts 14, the spring washers 165, and the fixing members 167 are all non-rotatable relative to one another.

Referring to FIG. 1 and FIG. 2 again, the support board 18 includes a sheet portion 181 defining a multisided hole 183 in a center thereof. The multisided hole 183 is generally polygonal, and in the preferred embodiment is approximately a square hole with rounded corners. The sheet portion 181 perpendicularly forms a pair of ears 185, and a projection 187, at two opposite sides thereof respectively. The ears 185 extend up in a same direction, and the projection 187 extends down in an opposite direction. Each of the ears 185 defines at least one assembling hole (not labeled). The projection 187 and the limiting protrusion 126 of the base body 12 cooperatively restrict a rotatable angle of the support board 18 relative to the base body 12. The sheet portion 181 of the support board 18 symmetrically defines two blind sunken portions at a top surface thereof, thereby forming two bulges 189 at a bottom surface thereof. The bulges 189 resist the resisting pieces 120 in the slots 129 of the base body 12.

The rotational mechanism includes a rotational shaft 191, a rotary member 193, a steady member 195, two elastic pieces 197, and a flat washer 199.

The rotational shaft 191 includes a shaft portion 1911 and a stopping portion 1913 adjoining the shaft portion 1911. The rotational shaft 191 defines a through hole 1915, for allowing wires to pass therethrough. The stopping portion 1913 is larger than the multisided hole 183 of the support board 18.

The rotary member 193 defines a round center hole 1930 therein, and includes a top multisided portion 1931. The multisided portion 1931 has a cross-section the same as the shape of the multisided hole 183 of the support board 18, so that the multisided portion 1931 can be non-rotatably engaged in the multisided hole 183. The rotary member 193 has an engaging surface 1932 opposite to the multisided portion 1931, and forms four peaks 1933 at the engaging surface 1932.

The steady member 195 is generally a prism, with a cross-section having a same size and shape as the cavity 125 of the base body 12. That is, the steady member 195 is approximately square with rounded corners, so it can be non-rotatably received in the cavity 125. The steady member 195 defines a round center hole 1950 therein, and has a top engaging surface 1951 for engaging with the engaging surface 1932 of the rotary member 193. The steady member 195 defines four valleys 1953 at the engaging surface 1951. In alternative embodiments, the number of peaks 1933 of the rotary member 193 and corresponding number of valleys 1953 of the steady member 195 may be any desired number, such as one, two, three, five, or more. The peaks 1933 and the valleys 1953 may also be omitted altogether.

The elastic pieces 197 are essentially bent sheets. Each elastic piece 197 is shaped so as to be non-rotatably received in the cavity 125 of the base body 12. Each elastic piece 197 defines a round hole (not labeled) in a center thereof. The flat washer 199 defines a round hole (not labeled) in a center thereof.

In assembly of the rotational mechanism, the elastic pieces 197 and the steady member 195 are received in the cavity 125 of the base body 12 in that order via the second end 1212. The shaft portion 1911 of the rotational shaft 191 is extended through the multisided hole 183 of the support board 18, the center hole 1930 of the rotary member 193, the center hole 1950 of the steady member 195, the elastic pieces 197, the cavity 125 and the end hole of the base body 12, and the flat washer 199. A riveting machine rivets an end piece to the shaft portion 1911 of the rotational shaft 191, thereby forming a holding portion 1917. The holding portion 1917 is opposite to the stopping portion 1913. The stopping portion 1913 and the holding portion 1917 of the rotational shaft 191 prevent the support board 18, the rotary member 193, the steady member 195, the elastic pieces 197, the base body 12, and the flat washer 199 from falling off the rotational shaft 191. Thus, the rotary member 193 is rotatable relative to the steady member 195.

Figure 5:
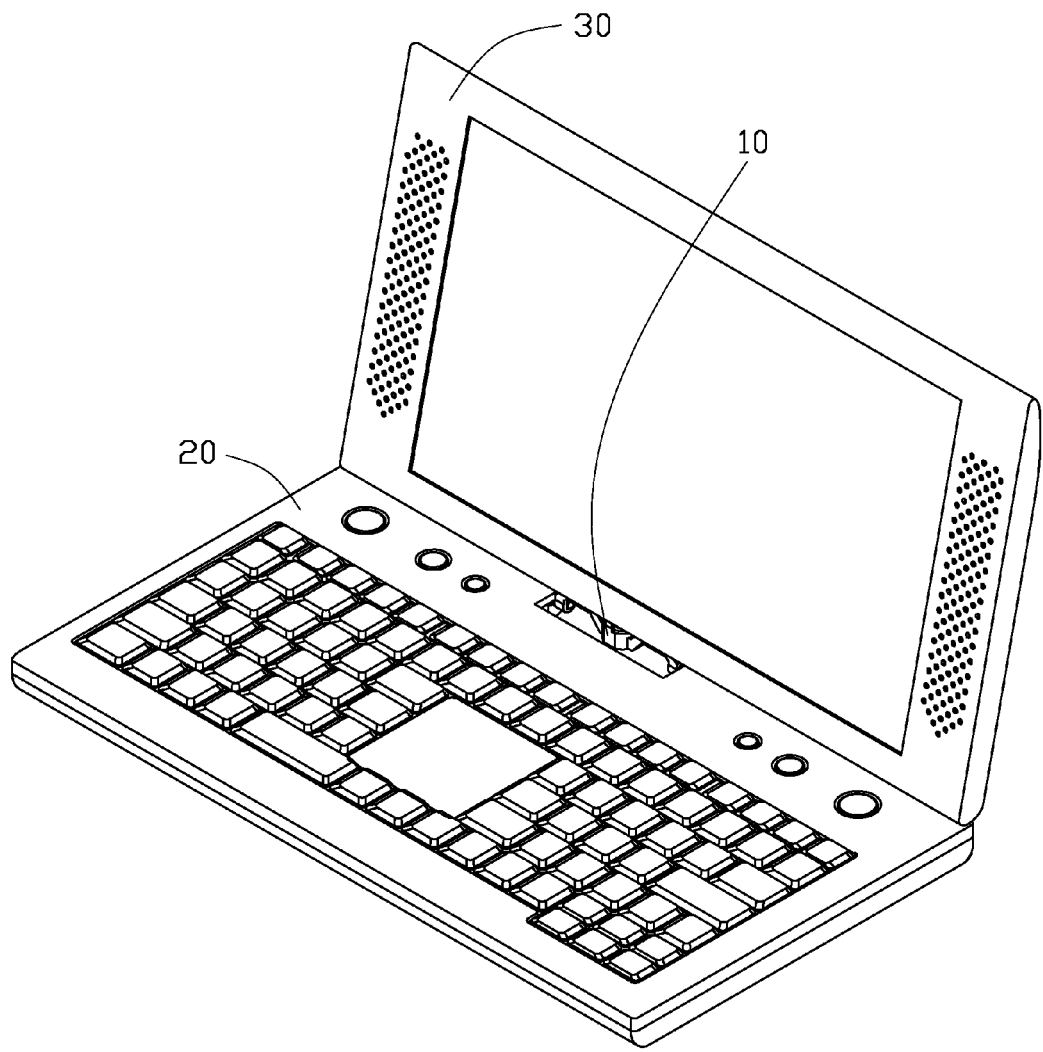
FIG. 5 is an isometric view of a notebook computer with the hinge assembly of FIG. 1, showing a monitor of the notebook computer rotated in a first direction about a horizontal axis.
Figure 6:
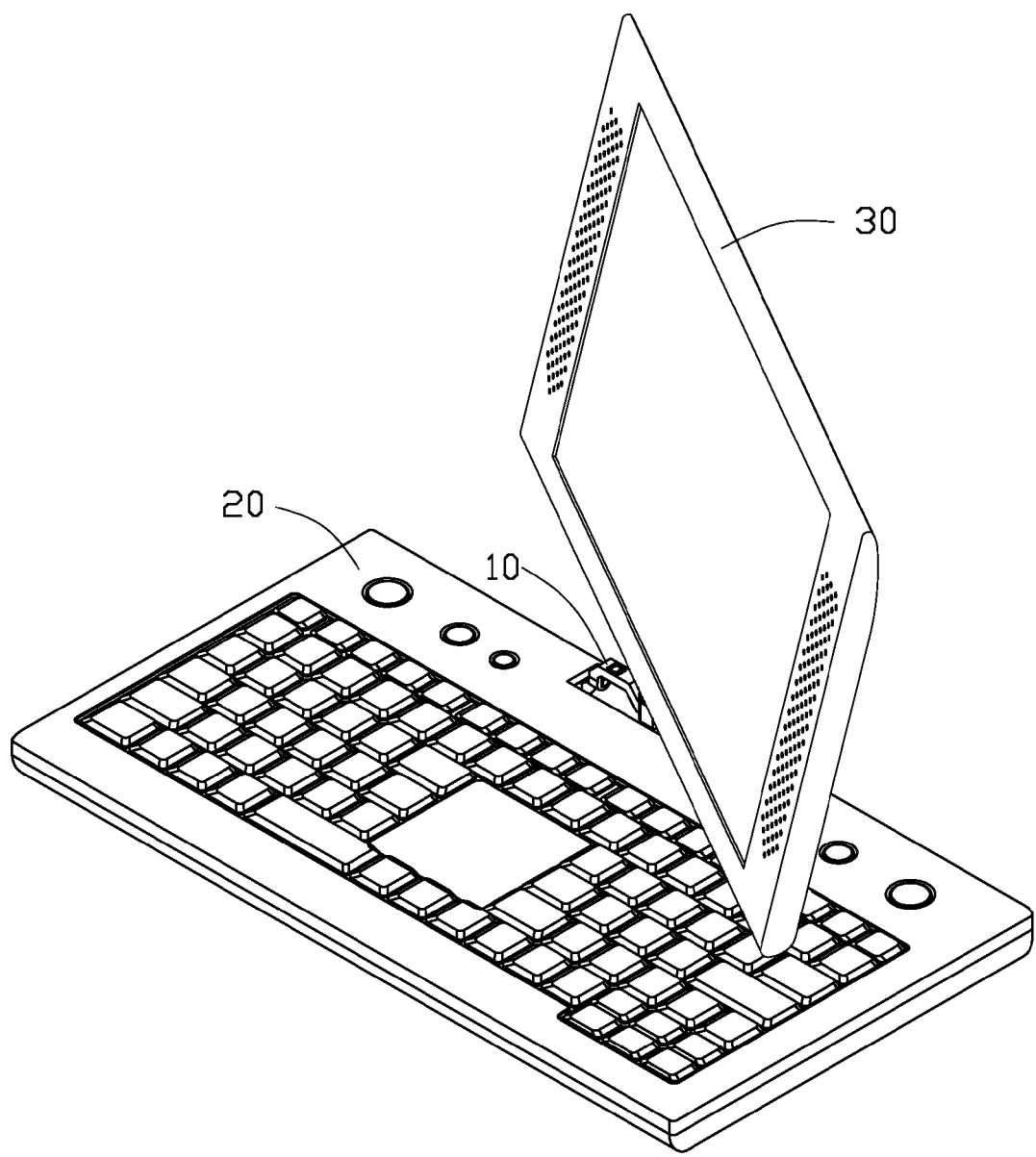
FIG. 6 is similar to FIG. 5, but showing the monitor of the notebook computer further rotated in a second direction about a second axis perpendicular to the horizontal axis.

Referring to FIG. 5, the notebook computer includes a main body 20, a monitor 30, and the hinge assembly 10 biaxially pivotally connecting the main body 20 and the monitor 30. The bracket 14 is fixed to the main body 20 by means of the mounting holes 146 of the mounting portions 143 and 145, and the support board 18 is fixed to the monitor 30 by means of the assembling holes of the ears 185. FIG. 5 shows the monitor 30 rotated through an angle around the axis A1. FIG. 6 shows the monitor 30 further rotated through an angle around the axis A2.

In use, when the monitor 30 is manually rotated around the axis A1, the base body 12, the pivotal shafts 163, the support board 18, the fixing members 167, and the rotational mechanism rotate together with the monitor 30 relative to the main body 20 and the brackets 14 fixed to the main body 20. The spring washers 165 provide axial forces in directions along the axis A1 so as to generate friction forces between the base body 12, the brackets 14, and the components of the pivotal mechanisms 16. Thus after the monitor 30 has been rotated to any desired position relative to the main body 20 around the axis of A1, the monitor 30 is retained in the desired position by said friction forces.

When the monitor 30 is manually rotated around the axis A2, the support board 18 and the rotary member 193 rotate together with the monitor 30 relative to the main body 20, the steady member 195, the base body 12, the brackets 14, and the pivotal mechanisms 16. When the monitor 30 reaches any one of predetermined rest positions, the peaks 1933 of the rotary member 193 are received in the corresponding valleys 1953 of the steady member 195. From any one of the rest positions, when the monitor 30 is rotated around the axis A2, the peaks 1933 slide out of the valleys 1953, and the steady member 195 drives the elastic pieces 197 to be compressed. Thus after the rotary member 193 has been rotated to any desired position relative to the steady member 195, elastic forces applied by the compressed elastic pieces 197 in directions parallel to the axis A2 enable the monitor 30 to be retained in the desired position relative to the main body 20. If the monitor 30 is rotated through an angle of 90, 180, or 270 degrees, the peaks 1933 are received in the corresponding valleys 1953, the elastic pieces 197 decompress, and the monitor is retained in the corresponding rest position. It is more difficult to move the monitor 30 from any of the rest positions that it is from other positions, because of the physical fitting engagement of the peaks 1933 in the valleys 1953. Suppose that the monitor 30 is in a middle position as regards rotation around the axis A2. When the monitor 30 is rotated a predetermined angle in a first direction, the limiting surface 1262 of the limiting protrusion 126 of the base body 12 blocks the projection 187 of the support board 18. Thereby, the monitor 30 is prevented from rotating further. When the monitor 30 is rotated a predetermined angle in a second direction opposite to the first direction, the limiting surface 1263 of the limiting protrusion 126 blocks the projection 187 of the support board 18. Thereby, the monitor 30 is prevented from rotating further. Thus overall, the range of angles of rotation of the monitor 30 relative to the main body 20 is limited.

It is believed that in many if not most instances, a user desires that the monitor 30 only be rotated around the axis A1 and not around the axis A2. Therefore in a normal starting position (including when the notebook computer is folded up and not in use), the resisting pieces 120 of the base body 12 are resiliently engaged with the bulges 189 of the support board 18. Thus, any rotation of the monitor 30 around the axis A2 away from the starting position must overcome friction force as between the resisting pieces 120 and the bulges 189. Thereby, when the monitor 30 is rotated around the axis A1 as desired, unintentional rotation of the monitor 30 around the axis A2 is avoided.

In an alternative embodiment, only a single pivotal mechanism 16 may be provided. In such case, two brackets 14 may still be provided. Alternatively, one of the arms 123 of the base body 12 can be omitted, and only a single bracket 14 can be provided. The holding portion 1917 of the rotational shaft 19 may be omitted. Instead, a bottom of the shaft portion 1911 of the rotational shaft 19 can define an annular groove; and a ring or a C-clip can be clipped in the groove. Other elastic members such as springs or elastic rubber rings or cylinders may replace the spring washers 165 and the elastic pieces 197. Each fixing member 167 may be welded to the corresponding pivotal shaft 165, or be fixed to the pivotal shaft 163 by riveting. In such cases, the fixing portion 1637 of the pivotal shaft 163 need not be threaded. Each pivotal shaft 163 and the base body 12 may be integrally manufactured. The mounting portions 143 and 145 may be mounted to the monitor 30 of the notebook computer, and accordingly the ears 185 of the support board 18 may be mounted to the main body 20 of the notebook computer. Each of the spring washers 165 can define around hole instead of the second keyed hole 1652.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A hinge assembly, comprising:
   a base body comprising a housing defining a cavity, the housing being in the form of a barrel, the cavity of the housing having a keyed shape, and an end of the housing defining an end hole smaller in diameter than and in communication with the cavity, an arm extending generally perpendicularly from an outer sidewall of the housing, a distal end of the arm defining a keyed hole;
   a bracket;
   a support board;
   a pivotal mechanism comprising a pivotal shaft fixed to the base body, an elastic member configured for providing axial force along an axis of the pivotal shaft, and a fixing member, the pivotal shaft extending through the bracket, the fixing member fixedly engaged with the pivotal shaft such that the elastic member and part of the bracket is held between the fixing member and the pivotal shaft, the base body being rotatable relative to the bracket around a first axis coinciding with the axis of the pivotal shaft; and
   a rotational mechanism comprising a rotational shaft, a rotary member, a steady member at least partially received in the cavity of the base body and held therein, and an elastic member received in the cavity of the base body, the rotational shaft extending through the support board, the rotary member, the steady member, the elastic member and the base body, the support board and the rotary member being rotatable in unison relative to a combination of the steady member and the base body around a second axis, each of the rotary member and the steady member defining an engaging surface, the engaging surfaces being movably engaged with each other, one of the engaging surfaces forming at least one peak, and the other of the engaging surfaces defining at least one valley corresponding to the at least one peak.

2. The hinge assembly as claimed in claim 1, further comprising at least one resisting piece fixed to the base body, wherein the at least one resisting piece is configured to elastically resist the support board when the support board is in a predefined normal position relative to the base body.

3. The hinge assembly as claimed in claim 2, wherein the base body further comprises a limiting protrusion formed at one end of the housing opposite to the end hole, the support board comprises a projection, and when the support board is fully rotated in a first direction, the limiting protrusion blocks the projection thereby restricting further rotation of the support board, and when the support board is fully rotated in a second direction opposite to the first direction, the limiting protrusion blocks the projection thereby restricting further rotation of the support board.

4. The hinge assembly as claimed in claim 3, wherein the arm defines at least one slot receiving the at least one resisting piece, and part of the pivotal shaft is fixed in the keyed hole.

5. The hinge assembly as claimed in claim 1, wherein the steady member has a cross-section the same as the keyed shape of the cavity so that the steady member is non-rotatably received in the cavity.

6. The hinge assembly as claimed in claim 4, wherein the bracket comprises a pivotal portion and two mounting portions, the pivotal portion and the mounting portions are all substantially perpendicular to one another, and the pivotal portion defines a round pivotal hole in which the pivotal shaft is rotatable.

7. The hinge assembly as claimed in claim 6, wherein the pivotal shaft comprises a flattened shaft portion, a flange, a pivotal shaft portion, and a fixing portion arranged in that order, the flattened shaft portion has a cross-section the same as a shape of the keyed hole of the base body so that the flattened shaft portion is non-rotatably engaged in the keyed hole of the arm, and the pivotal shaft portion is cylinder-shaped and rotatable in the round pivotal hole of the bracket.

8. The hinge assembly as claimed in claim 7, wherein a first washer is disposed between the flange of the pivotal shaft and the bracket, a second washer is disposed between the bracket and the elastic member, and a third washer is disposed between the elastic member and the fixing member, and the elastic member comprises two spring washers adjacent each other.

9. The hinge assembly as claimed in claim 8, wherein the fixing portion is threaded, the fixing member is a nut screwed on the fixing portion, the flange has a diameter larger than that of all the other portions of the pivotal shaft, the nut and the flange cooperatively prevent the flat washers, the spring washers and the bracket from disengaging from the pivotal shaft, and the pivotal shaft defines at least one flat surface commonly in the fixing portion and a part of the pivotal shaft portion such that the spring washers are non-rotatably engaged around the pivotal shaft.

10. The hinge assembly as claimed in claim 2, wherein the support board defines a keyed hole, and forms at least one bulge on a side thereof nearest the base body, the rotary member comprises a keyed portion non-rotatably engaged in the keyed hole of the support board, and the at least one bulge resists the at least one resisting piece of the base body when the support board is in the normal position.

11. The hinge assembly as claimed in claim 1, wherein the rotational shaft comprises a stopping portion, a holding portion, and a shaft portion disposed between the stopping portion and the holding portion, the rotational mechanism further comprises an elastic piece and a flat washer, the elastic piece is non-rotatably received in the cavity of the base body, the flat washer is disposed between the base body and the holding portion, and the stopping portion and the holding portion cooperatively prevent the support board, the rotary member, the steady member, the elastic piece, the base body, and the flat washer from disengaging from the rotational shaft.

12. An electronic device comprising:
a main body;
a monitor; and
a hinge assembly connecting the main body and the monitor such that the monitor is rotatable around two different axes relative to the main body, the hinge assembly comprising:
a base body comprising a housing defining a cavity and an arm, the cavity having keyed shape, and an end of the housing defining an end hole in communication with the cavity, the housing forms a limiting protrusion at one end thereof opposite to the end hole;
a bracket being fixed relative to one of the main body and the monitor, the base body being rotatable relative to the bracket around a first axis;
a support board being fixed relative to the other one of the main body and the monitor, the support board being rotatable relative to the base body around a second axis;
a pivotal mechanism for providing rotation around the first axis; and
a rotational mechanism for providing rotation around the second axis, the rotational mechanism comprising a rotational shaft, a rotary member, a steady member at least partially received in the cavity of the base body and held therein, and an elastic member received in the cavity of the base body, the rotational shaft extending through the support board, the rotary member, the steady member, the elastic member and the base body, the support board and the rotary member being rotatable in unison relative to the combination of the steady member and the base body around the second axis, each of the rotary member and the steady member defining an engaging surface, the engaging surfaces being movably engaged with each other, one of the engaging surfaces forming at least one peak, and another of the engaging surfaces defining at least one valley corresponding to the least one peak, the steady member having a cross-section the same as the keyed shape of the cavity so that the steady member non-rotatably received in the cavity.

13. The electronic device as claimed in claim 12, wherein the pivotal mechanism comprises a pivotal shaft fixed to the base body, a pair of spring washers, three flat washers, and a fixing member, the pivotal shaft is extended through the bracket, the spring washer; the flat washers, and fixing member, the bracket is rotatable relative to the pivotal shaft around the first axis, the flat washers are disposed between the flange of the pivotal shaft and the bracket, the bracket and the elastic member, the elastic member and the fixing member respectively.

14. The electronic device as claimed in claim 13, wherein the arm defines at least one slot receiving the at least one resisting piece, the arm defines a keyed hole therein, the at least one resisting piece is configured to elastically resist the support board when the support board is in a predefined normal position relative to the base body.

15. The electronic device as claimed in claim 14, wherein the pivotal shaft comprises a flattened shaft portion, a flange, a pivotal shaft portion, and a fixing portion arranged in that order, the flattened shaft portion is non-rotatably engaged in the keyed hole, the pivotal shaft portion is rotatable in the round pivotal hole of the bracket, the fixing portion is threaded, the fixing member is a nut screwed on the fixing portion.

16. The electronic device as claimed in claim 14, wherein the bracket comprises a pivotal portion, and two mounting portions, the mounting portions define at least one mounting hole, the bracket is fixed to one of the main body and the monitor by means of the mounting hole, the pivotal portion defines a round pivotal hole in which the pivotal shaft is rotatable.

17. The electronic device as claimed in claim 14, wherein the support board defines a keyed hole, and forms at least one bulge, an ear, and a projection, the at least one bulge is configured to resist the resisting pieces in the at least one slots of the base body when the support board is in the normal position, the ear extends up in a same direction and the projection extends down in an opposite direction, the ear defines at least one assembling hole, the support board is fixed to the other one of the main body and the monitor by means of the assembling hole, the projection is configured to engage with the limiting protrusion to determine a range of angles of rotation between the base body and the support board, the rotary member comprises a keyed portion for non-rotatably engaged in the keyed hole of the support board.

18. The electronic device as claimed in claim 12, wherein the rotational shaft comprises a stopping portion, holding portion and a shaft portion disposed between the stopping portion and the holding portion, the rotational mechanism further comprises a flat washer disposed between the base body and the holding portion, the elastic member comprises two elastic pieces non-rotatably received in the cavity of the base body, the stopping portion and the holding portion cooperatively prevent the support board, the rotary member, the steady member, the elastic pieces, the base body, and the flat washer from disengaging from the rotational shaft.

19. A hinge assembly, comprising:
  a base member comprising a housing, the housing defining a cavity, the housing comprising an arm defining at least one slot, the housing being in the form of a barrel, the cavity of the housing having a keyed shape, and an end of the housing defining an end hole smaller in diameter than and in communication with the cavity, an arm extending generally perpendicularly from an outer sidewall of the housing, a distal end of the arm defining a keyed hole;
  a support member forming at least one bulge corresponding to the at least one slot, the support member being rotatable relative to the base member around a first axis;
  a rotational mechanism rotatably connecting the base member and the support member, the rotational mechanism comprising a rotational shaft, a rotary member non-rotatably connected to the support member, a steady member non-rotatably and at least partially received in the cavity of the base member, and an elastic member, the rotational shaft extending through the support board, the rotary member, the steady member, the elastic member and the base body, the rotary member rotatably engaged with the steady member; and
  at least one resisting piece disposed in the at least one slot of the base member so as to resist the at least one bulge of the support member when the support member is in a predefined normal position relative to the base member.

20. The hinge assembly as claimed in claim 19, further comprising a bracket and a pivotal mechanism, the base member is rotatable relative to the bracket around a second axis, the pivotal mechanism rotatably connects the base member and the bracket, each of the rotary member and the steady member defines an engaging surface, one of the engaging surfaces forms four peaks, and another of the engaging surfaces defines four valleys accordingly.

* * * * *